United States Patent [19]
Westlake, Jr.

[11] Patent Number: 5,282,915
[45] Date of Patent: Feb. 1, 1994

[54] METHOD AND APPARATUS FOR PRODUCING CONTINUOUS PLASTIC-FABRIC BICOMPONENT LAMINA

[76] Inventor: Edward F. Westlake, Jr., 1012 Farm La., West Chester, Pa. 19382

[21] Appl. No.: 787,923

[22] Filed: Nov. 6, 1991

[51] Int. Cl.$^5$ .......................................... B29C 47/06
[52] U.S. Cl. .......................... 156/243; 156/244.11; 156/244.23; 156/244.24; 156/244.27; 156/498; 156/500
[58] Field of Search .............. 156/243, 244.11, 244.23, 156/244.24, 244.27, 500, 498

[56] References Cited

U.S. PATENT DOCUMENTS

| | | | |
|---|---|---|---|
| 2,714,571 | 8/1955 | Irion et al. | 156/244.27 |
| 2,897,109 | 7/1959 | Voightman | 156/244.27 |
| 3,058,863 | 10/1962 | Gaines et al. | 156/244.27 |

FOREIGN PATENT DOCUMENTS

| | | | |
|---|---|---|---|
| 2727285 | 1/1978 | Fed. Rep. of Germany | 156/244.27 |
| 5729 | 1/1981 | Japan | 156/244.27 |

*Primary Examiner*—Caleb Weston

[57] ABSTRACT

Method and apparatus for producing a continuous bicomponent lamina having thermoplastic on one side and fabric on the other side by pressing fabric into extruded thermoplastic with sufficient force to embed the fabric in the extruded thermoplastic to form the continuous bicomponent lamina.

22 Claims, 2 Drawing Sheets

METHOD AND APPARATUS FOR PRODUCING CONTINUOUS PLASTIC-FABRIC BICOMPONENT LAMINA

BACKGROUND OF THE INVENTION

1. Field of the Invention

This invention relates to continuously extruded lamina and methods of producing the same, specifically lamina having thermoplastic material on one side and fabric on the other, without use of binders, adhesives or the like to bond the thermoplastic and fabric at their interface, where these lamina can be of substantial thickness.

2. Description of the Prior Art

Lamina consisting of glass fibers on one side and plastic on the other are known, as are methods for manufacturing such lamina. A plastic-glass fiber lamina is manufactured by Symalit Lizenz A.G. in Switzerland and is available in the United States from GF Plastics Systems in Tuston, Calif. This product is generally described in Swiss patent 79-10261 assigned to Symalit Lizenz A.G.

That Swiss patent discloses pre-treating the surface of a thermoplastic, prior to application of glass material to the thermoplastic to form a lamina, by applying a volatile solvent, having between five and fifteen percent by weight of the thermoplastic dissolved therein together with dispersion colloids, and thereafter evaporating the volatile solvent so that a rough surface forms. After applying the solvent to the surface, the surface is dried with hot air to evaporate the solvent. The solvent preferably contains between about three (3.0%) and about nine (9.0%) percent by weight of the dispersion colloid, which is preferably a silicon or an aluminum compound, particularly silicon dioxide or aluminum oxide. A suitable solvent is disclosed to be DMF while the thermoplastic material is disclosed to be polyvinylidene fluoride.

The Swiss patent process is used for pre-treating the surface of the thermoplastic prior to application of a glass fiber to form a reinforced plastic layer, to provide resistance to pressure, corrosion, chemicals and high temperatures and to increase the mechanical strength of the structure.

It is also known to press fiber and molten thermoplastic together to form a fiber reinforced plastic. However, heretofore, it has only been known to do such with exceedingly thin plastic layers and thin fiber materials.

SUMMARY OF THE INVENTION

In one of its aspects this invention provides a method for producing a continuous bicomponent lamina of thermoplastic and fabric, where the resulting bicomponent lamina can be of substantial thickness and where either the thermoplastic or the fabric or both may be of substantial thickness, in which thermoplastic material is initially longitudinally extruded as a transversely elongated web. (As used herein "longitudinal", and variants thereof, denotes the direction plastic material travels as it exits an extruder; "transverse", and variants thereof, denotes a direction along the surface of the plastic material, perpendicular to the longitudinal direction.)

The fabric is advanced, also in a transversely elongated form, from a fabric supply and may be heated while being advanced. The fabric and the thermoplastic web are pressed together to bond them to form the continuous bicomponent lamina. Temperature of the thermoplastic-fabric combination may be regulated during or in the neighborhood of the pressing operation; pressing is performed with relatively high force. The pressed together fabric and thermoplastic web forming the continuous bicomponent lamina are advanced by initially applying motive force to a side of the thermoplastic-fabric combination after pressing to form the continuous bicomponent lamina; preferably the motive force is applied to the plastic side of the continuous bicomponent lamina immediately after pressing. Further preferably, the motive force is applied to the plastic side while temperature of the thermoplastic-fabric combination defining the continuous bicomponent lamina is being regulated.

After initially pressing the fabric and the thermoplastic web together to bond them into a continuous bicomponent lamina, while regulating temperature of the thermoplastic-fabric combination, temperature of the resulting continuous thermoplastic-fabric bicomponent lamina may be further regulated and the bicomponent lamina may be pressed together, for additional time, using lower force. As the temperature of the resulting continuous thermoplastic-fabric bicomponent lamina is further regulated, the thermoplastic-fabric bicomponent lamina is preferably continuously advanced, preferably by application of motive force to a surface of the thermoplastic-fabric combination. Further preferably, the motive force applied to a surface of the thermoplastic-fabric combination during this second phase of temperature regulation is applied to the side of the thermoplastic-fabric bicomponent lamina opposite that to which motive force is applied immediately after the pressing operation, during the first phase of temperature regulation.

The thermoplastic is preferably selected from the group consisting of polyvinylidene fluoride, polyethylene, polypropylene, an ECTFE fluoropolymer, specifically ethylene chlortrifluorethylene, polyetherimid resins, polysulfone and polyethersulfone; however any thermoplastic may be used.

When the fabric and thermoplastic web are initially pressed together, the thermoplastic web is preferably at a first preselected temperature at which the thermoplastic is in a readily deformable, pliable state.

The thermoplastic material prior to contacting the fabric exits an extruder as a thermoplastic web produced by a conventional extrusion sheeting die. As the thermoplastic material exits the extruder, the material cools, at least slightly, to a temperature at which the thermoplastic material is a relatively soft web, so that the web surface is penetrable by fabric. The fabric is then applied against the relatively soft thermoplastic web with sufficient force to cause the fabric to penetrate the thermoplastic to a depth that the fabric is tightly retained by and effectively bonded to the thermoplastic web. This occurs as the web continues to cool, becoming more and more viscous and eventually solidifying. As a result, the fabric is tightly retained by and effectively bonded to the thermoplastic web when the web has cooled.

The temperature of the thermoplastic web upon exiting the conventional sheeting die must be adequately high to cause the surface of the thermoplastic web to receive the fabric, but not so high as to melt the fabric when the fabric is pressed against the thermoplastic web surface. Of course, the permissible temperature of the thermoplastic web upon existing the sheeting die will vary depending on the characteristics of the fabric to be pressed against the thermoplastic web surface.

The fabric cannot be excessively porous. If the fabric is too porous or too thin, the thermoplastic material may pass completely through the fabric when the web and fabric are pressed together to bond them to form the continuous bicomponent lamina. Various materials, both textile and non-textile in nature, including glass materials, may be used as the fabric to form the continuous bicomponent lamina of the invention.

In another of its aspects, this invention provides apparatus for producing a continuous bicomponent lamina of a thermoplastic web and fabric where the apparatus includes means for extruding thermoplastic material as a web. The apparatus further includes means for pressing such fabric against the thermoplastic web with preselected force, to cause the fabric to penetrate the thermoplastic web to a depth sufficient that the fabric is tightly retained by and effectively bonded to the thermoplastic web when the web cools to room temperature. The apparatus further includes means for progressively advancing the fabric from a fabric supply towards the extruded thermoplastic web.

The apparatus yet further includes means for progressively pressing the fabric and the web together with first force, to bond the fabric and web to create the continuous bicomponent lamina. The pressing means also advances the fabric and the web while contacting one side of the thermoplastic web-fabric combination immediately after the pressing operation to thereby regulate heat transfer to and from the continuous bicomponent lamina. This maintains the bicomponent lamina at a temperature above ambient but, preferably, less than temperature of the thermoplastic web upon leaving the extruder.

The apparatus encompassing the pressing means further includes means for applying motive advancing force to a first side of the fabric-web combination after the pressing has created the continuous bicomponent lamina. The means for applying motive force acts to advance the continuous bicomponent lamina while heat transfer to and from the continuous bicomponent lamina is regulated.

The apparatus still further includes means for progressively advancing the bicomponent lamina while continuing to contact one side of the bicomponent lamina, in order to further control heat transfer to and from the bicomponent lamina. This means for progressively advancing the bicomponent lamina includes means for applying motive force to one side of the bicomponent lamina while heat transfer is being controlled to and from the bicomponent lamina. This second means for applying motive advancing force to the bicomponent lamina to advance the bicomponent lamina preferably applies the motive force to a remaining side of the bicomponent lamina (relative to the side to which the motive force is first applied by the means discussed in the preceding paragraph.)

An exceedingly important aspect of the invention is provision of means to apply motive advancing force to respective sides of the bicomponent lamina, to advance the bicomponent lamina, by advancing respective sides of the bicomponent lamina serially at different, independently controlled speeds. This facilitates the manufacture of bicomponent lamina of substantial thicknesses. The motive force application means are independent and the speed at which such motive advancing force is applied can be independently varied; the two means are not mechanically tied together.

The apparatus still further optionally includes means for continuing pressing the thermoplastic-fabric continuous bicomponent lamina, using a second force reduced from the first force. This portion of the apparatus further progressively advances the lamina, after optionally pressing the lamina with the second force, until the bicomponent lamina has cooled to a temperature at which the bicomponent lamina can be easily handled.

DESCRIPTION OF THE PREFERRED EMBODIMENT AND BEST MODE KNOWN FOR PRACTICING THE INVENTION

Figure 1:
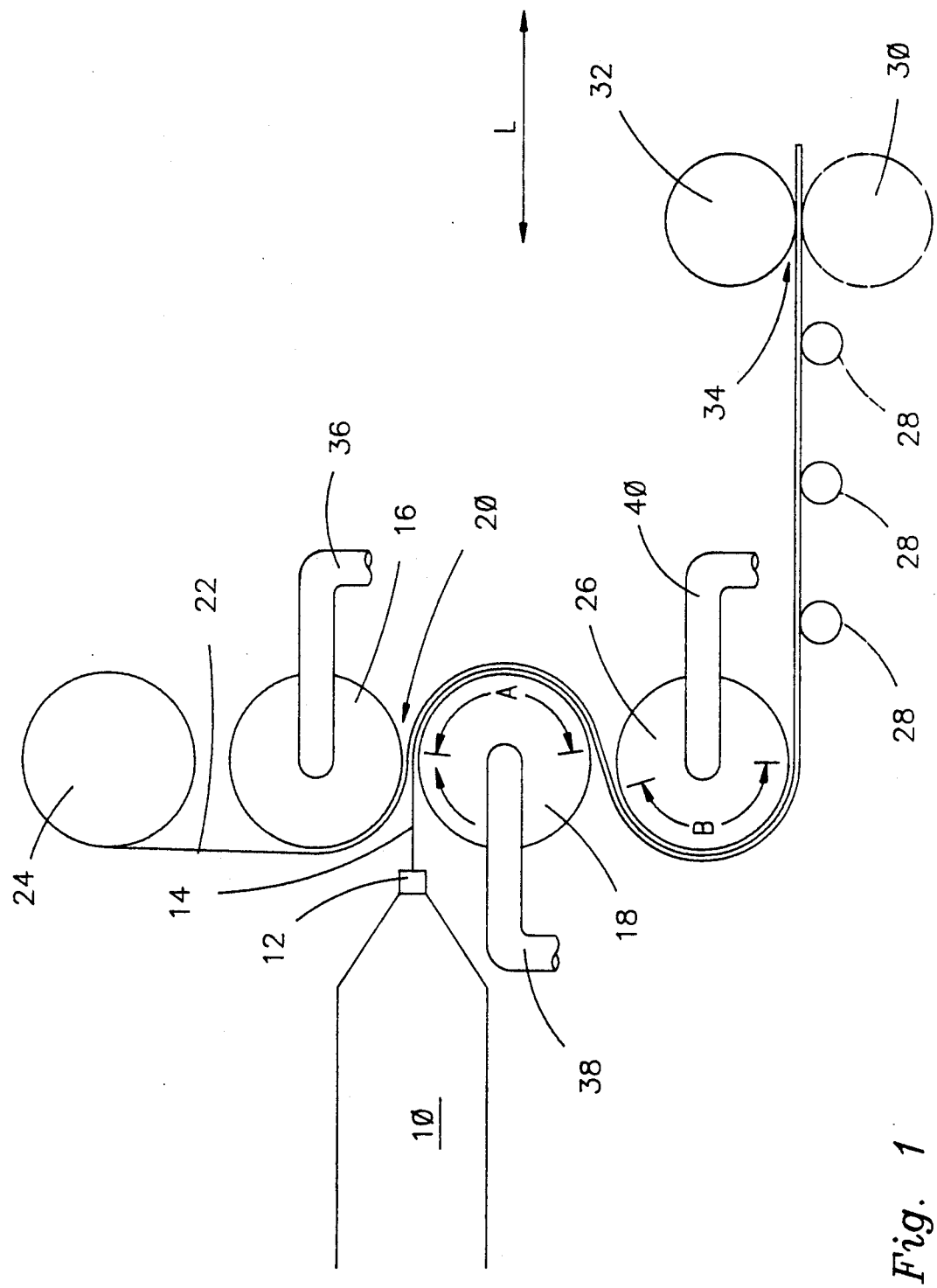
FIG. 1 is a schematic representation of apparatus for fabricating a continuous bicomponent lamina of thermoplastic and fabric according to the invention.

FIG. 1 schematically illustrates a preferred embodiment of apparatus for producing a continuous bicomponent lamina, consisting of a thermoplastic web and fabric, manifesting aspects of the invention. In FIG. 1 an extruder is designated 10, is conventional in nature and provides a highly viscous thermoplastic material to a conventional extrusion die 12 through which the highly viscous thermoplastic material is extruded as a web, with the highly viscous thermoplastic material longitudinally exiting the die as a transversely elongated web 14. (In the drawing, the longitudinal direction is denoted by double-ended arrow L while the transverse direction is perpendicular to the plane of the paper.)

Two heated, force-applying rollers, designated respectively 16, 18, define a roller nip 20 to which the heated thermoplastic web 14 is supplied by die 12.

Fabric designated generally 22 may be progressively supplied from an unheated fabric supply roller 24. Fabric 22 passes partially around roller 16, and may be heated thereby, prior to contacting extruded thermoplastic web 14, which in turn is prior to the combination of fabric 22 and thermoplastic web 14 entering roller nip 20.

Rotation of roller 16 carries fabric 22 into contact with thermoplastic web 14 just before the combination of fabric 22 and thermoplastic web 14 enters roller nip 20.

At roller nip 20, fabric 22 and thermoplastic web 14 are pressed together, as fabric 22 and web 14 are drawn between rollers 16, 18 and forced to pass through the narrow space separating these rollers and defining roller nip 20. Spacing of rollers 16, 18 to define roller nip 20 is adjusted according to the thickness of fabric 22 and thermoplastic web 14, to provide the desired force pressing fabric 22 and thermoplastic web 14 together to form the continuous bicomponent lamina. Central roller 18 is preferably fixed such that its axis of rotation cannot be moved longitudinally or transversely while the axis of rotation of roller 16 is preferably moveable to adjust the space defining roller nip 20.

The applied force, which is a function of distance separating rollers 16 and 18 at the nip 20 and of the thickness of thermoplastic web 14 and fabric 22, is adjusted until fabric 22 penetrates the surface of thermoplastic web 14 sufficiently far that when the extruded thermoplastic web 14 cools to room temperature, fabric 22 is tightly retained within thermoplastic web 14. Of course, the force cannot be too high or fabric 22 will pass through thermoplastic web 14, thereby providing a fabric-reinforced thermoplastic web (as opposed to a continuous thermoplastic web-fabric bicomponent lamina, which is the desired product). The desired force applied at roller nip 20 is referred to as a first force.

Rollers 16 and 18 preferably are both heated so that the continuous thermoplastic web-fabric bicomponent lamina does not cool excessively as the continuous bicomponent lamina is formed at roller nip 20. Because both rollers 16 and 18 preferably are heated, heat transfer to and from the continuous bicomponent lamina can be regulated as the continuous bicomponent lamina is formed at the roller nip 20 by roller 16 contacting fabric 22 and urging it against thermoplastic web 14. Since thermoplastic web 14 is preferably at a higher temperature exiting die 12 than the temperature of roller 18, the elevated temperature of roller 18 (relative to ambient) has the effect of retarding cooling of web 14 when roller 18 contacts web 14 at nip 20.

Because roller 18 is preferably at a temperature elevated relative to ambient but less than the temperature of web 14 exiting die 12, roller 18 regulates the temperature of the continuous bicomponent lamina by contacting the plastic surface of the bicomponent lamina. Roller 18 also applies motive advancing force to the plastic surface of the bicomponent lamina as roller 18 receives and transports the continuous bicomponent lamina formed at nip 20. Depending on the rate of convection cooling of the resulting lamina (after being formed at nip 20) as the continuous bicomponent lamina is carried on the surface of roller 18 through an arc "A" approaching 180 degrees, as illustrated in FIG. 1, roller 18 may effectively be heating the continuous bicomponent lamina by the time the continuous bicomponent lamina (specifically the thermoplastic surface thereof) separates from roller 18.

After progressively advancing through arc "A", which approaches 180 degrees, while traveling on the surface of roller 18, the continuous bicomponent lamina is transferred to the surface of roller 26. The temperature of roller 26 is regulated, preferably by introduction of controlled temperature fluid into the interior of roller 26. The temperature of roller 26 may be higher or lower than the temperature of roller 18, depending on the materials being processed into the continuous bicomponent lamina. The continuous bicomponent lamina progressively advances through another arc "B", which also approaches 180 degrees, while traveling on the surface of roller 26, which like rollers 16 and 18 is a driven roller.

Roller 26 applies motive advancing force to the fabric side of the continuous bicomponent lamina and is preferably heated so that heat transfer to and from the continuous bicomponent lamina may be regulated as the lamina progressively advances through arc "B" while traveling on roller 26. This heat transfer, which is controlled, is at the fabric side of the lamina, as illustrated in FIG. 1.

Rollers 16, 18 and 26 are independently driven at speeds which may be independent of and different from each other. Thus, motive advancing force may be applied to the plastic side of the continuous bicomponent lamina by driven roller 18 rotating at a first speed (and thereby moving the plastic exterior surface of the continuous bicomponent lamina at a first speed) while roller 26 may be driven at a second speed to thereby apply motive advancing force to the surface of the fabric side of the continuous bicomponent lamina at a second speed. This independent speed drive capability of rollers 16, 18 and 26 facilitates use of the apparatus to produce continuous bicomponent lamina of substantial thickness.

Rollers 26 and 16 are preferably moveable vertically relative to roller 18. This permits use of two roller nips if desired. Where only a single roller nip is to be present, the roller nip may be between rollers 16 and 18, as indicated by nip 20 in FIG. 1, or between rollers 18 and 26.

After progressively advancing through ar "B" while traveling on the surface of heated roller 26, the continuous bicomponent lamina is preferably carried via transport rolls 28 to a pair of driven pull rolls 30, 32, which are closely spaced to define a pulling nip 34 therebetween.

Rolls 30, 32 are preferably rubber surfaced to grip and advance the thermoplastic web-fabric continuous bicomponent lamina by applying motive force thereto. Rolls 30, 32 press against the continuous bicomponent lamina at nip 34 sufficiently to grip and progressively advance the continuous bicomponent lamina; rolls 30, 32 are not heated and do not serve substantially to press the fabric further into the surface of the thermoplastic web. Rolls 30, 32 are preferably sufficiently far removed from roller 26 so that by the time the continuous bicomponent lamina reaches rolls 30, 32, the thermoplastic web has cooled and solidified sufficiently to securely retain the embedded fabric.

Fabric supply roll 24 is preferably an idler roll. Similarly, transport rolls 28 are also preferably idler rolls while rolls 30, 32 are preferably driven rolls serving to pull and advance the continuous bicomponent lamina as the continuous bicomponent lamina passes around roll 26. Action of driven rolls 16, 18 helps to pull the extruded thermoplastic web 14 out of die 12 and similarly helps to remove fabric 22 from undriven supply roll 24. Roll 24 preferably has a brake or ratchet associated therewith to prevent roll 24 from freewheeling and consequently overfeeding the fabric.

The vertical positions of rolls 16 and 26 are adjustable, to vary the force applied at the roll nips. Rolls 16, 18 are also temperature controlled; preferably, heated fluid is provided via feed pipes shown schematically as 36, 38 to rolls 16, 18. Likewise, roll 26 is preferably heated by fluid supplied via schematically illustrated feed pipe 40. Driven rolls 16, 18 and 26 are independently driven; the speeds of rotation of rolls 16, 18 and 26 are independent of one another. Driven rollers 16, 18, 26, 30 and 32 are equipped with individual speed controls and gear reducers to finely adjust the speed of the rolls and the bicomponent lamina moving therealong.

Variable speed of the drive rolls accommodates stretching properties present in some fabrics and thermoplastics. Additionally, variable speed of the drive rolls may be required for thick bicomponent lamina since when an extremely thick bicomponent lamina is moved by motive force applied by the drive rolls, the difference in radius between the two surfaces of the bicomponent lamina traveling on the rolls requires a difference in roll speed from one roll to the next.

Temperature differences between the roll surfaces may result in warpage after passage along the rolls.

Figure 2:
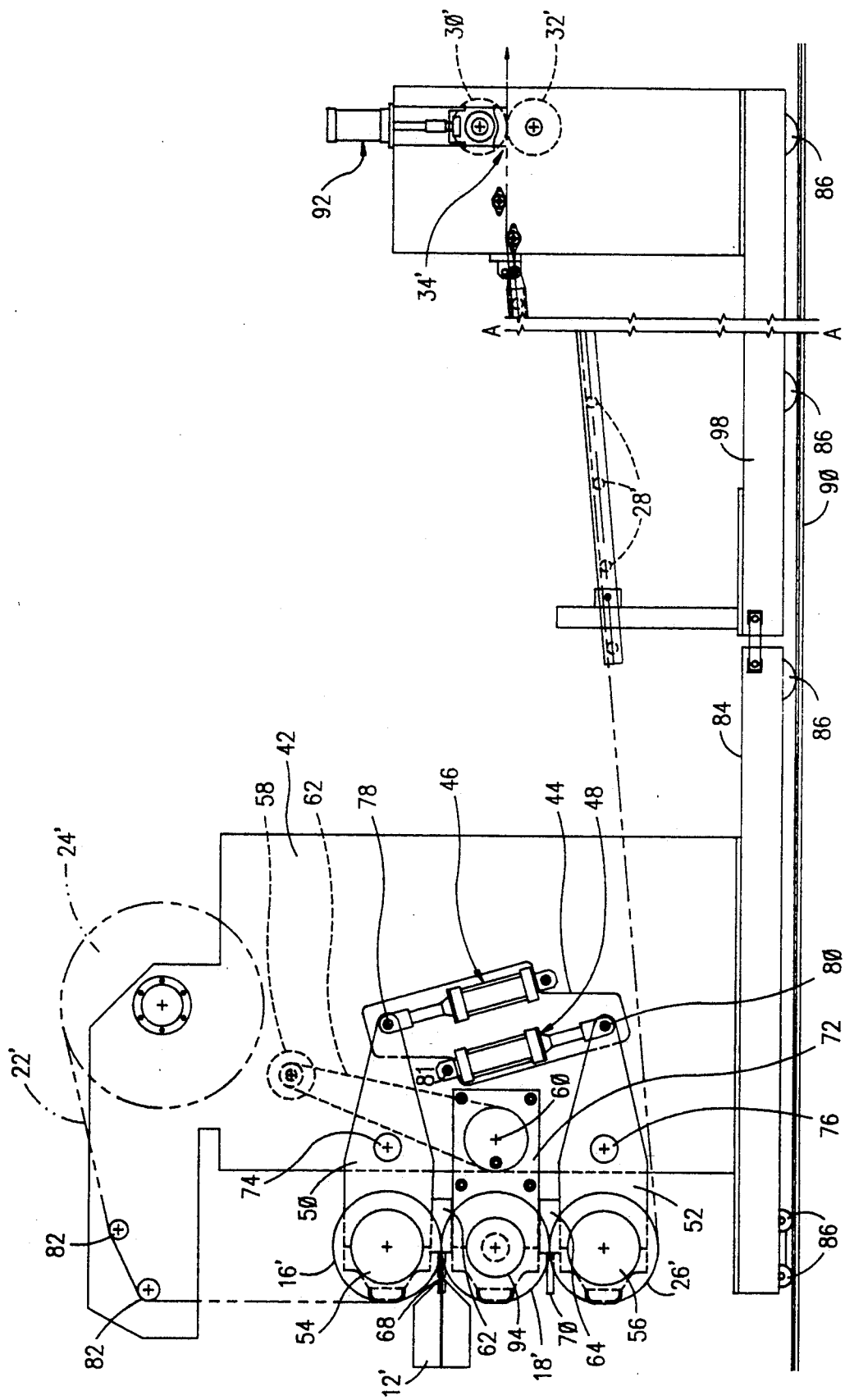
FIG. 2 is a more detailed representation of apparatus for fabricating a continuous bicomponent lamina of thermoplastic and fabric according to the invention, illustrating additional features of apparatus embodying aspects of the invention.

FIG. 2 presents a more detailed representation of apparatus for fabricating a continuous bicomponent lamina of thermoplastic and fabric according to the invention where break lines A-A indicate foreshortening of the representation of the apparatus, to minimize the size of the drawing. In FIG. 2, elements corresponding to those shown schematically and identified in FIG. 1 are denoted with prime notation.

In FIG. 2, a side frame is designated generally 42 and has an opening 44 therein. Side frame 42, of which there are two parallel to one another with only one being visible in the drawing, is mounted securely on first trolley base 84 which includes trolley wheels 86 for travel along trolley rails 90. First trolley base 84 is tied to second trolley base 86 by a removable connector, not numbered in the drawings. Similarly to first trolley base 84, second trolley base 88 rests on trolley wheels 86 which roll on trolley rails 90.

Side frames 42 serve as the basic frame members on which any of the other components of the apparatus embodying the invention are mounted.

An extruder provides molten, viscous thermoplastic to a die 12' from which the thermoplastic is extruded as a transversely elongated web, as described above. The web of thermoplastic and a corresponding web of fabric 22' are pressed together by rollers 16', 18' to embed the fabric in the thermoplastic, with the fabric stopping short of passing entirely through the thermoplastic.

After traveling on the surface of drive roller 18' and thereafter on the surface of drive roller 26' in the manner indicated schematically in FIG. 1, the continuous bicomponent lamina 100 travels upwardly, to the right in FIG. 2, and is pulled by a pair of pull rolls 30', 32' defining a pulling nip 34'.

Rolls 30', 32' are driven by a motor, connected to follow the speed of driven rolls 16', 18' and 26'; operator control of the motor driving rolls 30', 32' is provided so that an operator can adjust tension of the bicomponent lamina as it is pulled by rolls 30', 32'.

Roller 16' is pivotally mounted for rotation on first pivoting arms 50 which are in turn respectively mounted to side frames 42 by pivot mounts 74. The end of a respective first pivoting arm 50 opposite that at which roller 16' is mounted is pivotally connected to the piston rod of a first hydraulic-piston cylinder combination 46. The pivotal connection of first pivoting arm 50 and the piston rod of first hydraulic-piston cylinder combination 46 is denoted 78. First hydraulic-piston cylinder combination is attached to side frame 42 by a pivotal connection not numbered in the drawing.

Drive roller 26' is similarly mounted on respective second pivoting arms 52 for rotation with respect to second pivoting arms 52. A pivot mount 76 for second pivoting arm 52 connects second pivoting arm 52 to side frame 42. The end of second pivoting arm 52 opposite that on which roller 26 is mounted is pivotally connected via a pivot connection 80 to the piston rod of a second piston-cylinder combination 48. Second hydraulic piston-cylinder combination 48 is connected to side frame 42 via a suitable pivotal connection 81.

Fabric supply roller 24' is mounted on side frames 42 via suitable bearings, not shown in the drawings. Fabric idler rollers 82, also mounted between side frames 42, guide the fabric web 22' from fabric supply roller 24' to contact with drive roller 16' for transport into contact with the thermoplastic web.

Roller 16' is preferably driven by a first, preferably electric, roller drive motor 54. Similarly, drive roller 26' is preferably driven by a second, preferably electrically powered, roller drive motor 56. Roller drive motors 54, 56 are preferably mounted together with their respective drive rolls 16', 26' on first and second pivoting arms 50, 52 for movement with respective drive rollers 16', 26' as arms 50, 52 pivot.

Center drive roller 18' is preferably rotatably mounted between respective roller cantilever arms 72, cantilevered outwardly from side frames 42. As a result, the axis of rotation of center drive roller 18' is not moveable relative to side frame 42. Roller cantilever arms 72 are secured to side frames 42, preferably by bolts not numbered in the drawing.

Central drive roller 18, may be powered by an electrically powered drive motor similarly to drive rollers 16', 26' or may be chain driven. In the case of chain drive, a roller drive sprocket 58 may be provided rotatably mounted on side frame 42. A roller drive chain 62 may connect roller drive sprocket 58 with a roller intermediate sprocket 60. A second chain may connect roller intermediate sprocket 60 with a roller driven sprocket 94. Alternatively, an electric roller drive motor may be provided in the position indicated by roller driven sprocket 94 in FIG. 2.

Spacing between rollers 16', 18' and between rollers 18', 26' is adjustable. Spacer blocks 62, 64 are provided and are preferably connected to roller cantilever arm 72, but are moveable with respect to roller cantilever arm 72. Preferably, hand-adjustable worm gear drives are provided, actuated by hand-driven worms 68, 70. Specifically, hand-driven worm 68 is associated with the upper roller spacer block 62 used to space roller 16' relative to roller 18. Similarly, hand-driven worm 70 is associated with lower roller spacer block 64 used to space drive roller 26' relative to drive roller 18'.

Upon rotation of an associated hand-driven worm, such as worm 70, the associated spacer block such as 64 moves away from roller cantilever arm 72 in a generally vertical direction, into position for abutment with a suitable facing contact surface of an adjacent pivoting arm, for example, second pivoting arm 52. As a result, by an operator hand-positioning (using the hand-operated worm gear drives, the details of which are not shown in the drawing) the roller spacer blocks 64, 66 and thereafter actuating respective hydraulic piston cylinder combinations 46 48 (to extend respective piston rods and thereby rotate respective pivoting arms 50, 52 about pivots 74, 76 until pivoting arms 50, 52 contact respective spacer blocks 64, 66) position of respective rollers 16', 18' to adjust the size of the space defining nip 20 may be adjusted. In a similar manner the space between rollers 18', 26' may also be adjusted. Pivot arms 50, 52 preferably have geometry such that when rolls 16 and 26 have been moved the maximum distance away from roll 18, at least four (4) inches of clearance between respective adjacent rolls is available.

The dual trolley arrangement illustrated in FIG. 2 permits distance between secondary pulling rolls 30', 32' and the position at which the bicomponent lamina is formed to be adjusted. Depending on the temperature at which the bicomponent lamina is formed, more or less distance, and consequent travel time, may be required between the position at which the bicomponent lamina is formed and secondary pulling rolls 30, 32 to permit the bicomponent lamina to cool to a temperature at which it can be handled, is solid and can be cut. Accordingly, break lines A-A in FIG. 2 are intended to convey the fact that the position of pulling rolls 30', 32' vis-a-vis die 12' and driven rolls 16', 18' and 26' is adjustable.

Force at nip 34' between pulling rolls 30' and 32' may be adjusted by a third hydraulic piston-cylinder combination 92.

Pulling rolls 30', 32' may also press a masking protective coating to the thermoplastic side of the bicomponent lamina. In such case, such a protective masking coating may be supplied via a supply roller located intermediate of the secondary pulling rolls 30', 32' and principal drive rolls 16', 18' and 26'.

The invention may be used to manufacture a continuous bicomponent lamina with the thermoplastic being polyvinylidene fluoride or polypropylene or ECTFE. The fabric may be polyester fabric or a glass fabric. Other thermoplastics that may be processed to form the plastic portion of the bicomponent lamina are polyetherimid resins, polysulfone and polyethersulfone. In such cases, the temperature of rolls 16, 18 and 26 may be as high as about 575 degrees F. while the temperature of the plastic melt within extruder 10 may be in the neighborhood of from 750 degrees F. to 800 degrees F. It is believed that the thermoplastic should be at approximately the glass transition point (which for polyvinylidene fluoride and polypropylene is believed to be in the neighborhood of 360 degrees F. to 375 degrees F.) upon leaving the extruder 10.

In general, the fabric may be thinner than the plastic against which the fabric is pressed to form the continuous bicomponent lamina.

Force at nip 20 is a more critical variable than temperature of the rolls. The force must be sufficiently high to force the fabric into the semi-molten, viscous plastic but not so high that the fabric goes all the way through the plastic and emerges or creates an impression on the surface of the plastic facing away from the fabric.

Respecting temperature, it is important that the thermoplastic web be just hot enough to make the fabric adhere to and bond with the thermoplastic. Of course, the thermoplastic temperature must be less than melting point of the fabric; this can be a problem if the fabric is polyester since polyester has a melting point in the neighborhood of 380 degrees F. to 390 degrees F. If glass is used as the fabric, the fabric melting point is not a problem.

The temperature of bottom roll 26 must be maintained high enough to prevent the continuous bicomponent lamina from cooling too quickly and cracking as the lamina, in its still somewhat flexible form, moves on bottom roll 26 around the arc defined by the moving surface of bottom roll 26. Hence, heated oil, supplied to bottom roll 26, effectively regulates cooling of the continuous bicomponent lamina while the lamina contacts the surface of roll 26. Temperatures are maintained by supplying hot oil through respective feed pipes 36, 38, 40. Rolls 16 and 18 are temperature regulated preferably to be maintained at a temperature slightly cooler than the temperature at which web 14 exits the extruder, to prevent web 14 and continuous bicomponent lamina 20 from sticking to the rolls.

Cooling water is used in conjunction with a heat exchanger to regulate the temperature of the oil supplied to rolls 16, 18, 26, to rapidly cool the apparatus when it is desired to service or disassemble the apparatus. Each roll 16, 18, 26 has a separate temperature control associated therewith to regulate the temperature of each roll by controlling the amount of heating (or colling) oil supplied to each roll interior. Typically about one hundred (100) gallons per minute of oil is supplied to the interior of each roll 16, 18, 26 to maintain the roll at a preselected temperature.

From about 700 to about 1100 pounds of force are desirably used to force the nip rolls together; the nip rolls act in response to pressure of hydraulic fluid on the pistons within the cylinders of piston-cylinder combinations connected to the vertically moveable rolls. Sometimes even higher force is used; sometimes force in the neighborhood of 800 to 1,000 pounds per linear inch along the nip rolls may be used.

The web of thermoplastic 14 may be about 52 inches wide upon exiting die 12 prior to entry into the nip 20 defined between rolls 16, 18. The continuous bicomponent lamina may be up to about one-half inch or even greater in thickness. The thermoplastic leaving the extruder die can be up to about one-half inch thick; however, typical thicknesses of from 0.030 inch through 0.125 inch up to about 0.250 inch thick plastic (leaving the extruder) are believed to be the most useful range of thicknesses of the extruded thermoplastic web before having the fabric pressed into it.

Rolls 16, 18 and 26 have been sixty (60) inches along their axes. Extruder die 12 has been fifty-four (54) inches in width and the finished bicomponent lamina has been fifty (50) inches wide. Temperature of the melt within extruder 10 has been from 750 degrees F. to 800 degrees F. Thickness of the bicomponent lamina when finished may vary about from 0.030 to 0.5 inches or even more. Output rate may be from 350 to 500 pounds per hour of bicomponent lamina having the aforementioned width and thickness.

Rolls 16, 18 and 26 may be sixteen (16) inch nominal diameter. These rolls are commercially available and are preferably chrome-plated and polished to a 2-3 RMS finish, having a total indicated run out of 0.0005 inches.

Each roll 16, 18 and 26 is preferably provided with an air bleed and a rotary union at both ends, for the supply and return of temperature controlled heating oil to regulate temperature of the roll. The rolls are preferably double shell construction with the outer shell having a minimum thickness of about 0.75 inches.

The thermoplastic web-fabric continuous bicomponent lamina may move at a speed of about 15 to about 30 inches per minute after passing through nip 20, along rolls 18, 26, as the rolls rotate and the continuous bicomponent lamina is pulled by secondary rolls 30, 32. Action of secondary rolls 30, 32 may be adjusted to pull the continuous bicomponent lamina to effectively cause the thermoplastic web to apply additional pressure to the fabric-thermoplastic web interface, as the thermoplastic web is pulled against the surface of roll 26 and is further forced into intimate contact with fabric 22 pressing against the surface of roll 26. This optional selectable pulling of the continuous bicomponent lamina by secondary rollers 30, 32 may provide a secondary force, substantially reduced from the first force applied at roller nip 20, which is continuously applied to the lamina as the lamina travels around an arc defined by the surface of roll 26.

In addition to the polyvinylidene fluoride, polypropylene, ECTFE, polyetherimid resin, polysulfone and polyethersulfone which may be used as the thermoplastic to form the web, polyethylene, various flame retardant polyolefins and other thermoplastics may be extruded to form the thermoplastic web. In addition to polyester and glass, any synthetic or natural fabric having a high enough melting point may be used as the fabric. To produce a flame retardant product, a flame retardant fabric may be combined with a flame retardant thermoplastic material defining the web, to form the continuous bicomponent lamina.

A major advantage achieved by extruding the thermoplastic web is effective inherent stress-relief of the thermoplastic web, thereby permitting the thermoplastic to flow and to expand. This eliminates the tendency of the thermoplastic to separate from the fabric, as the thermoplastic attempts to relieve itself of internal stresses after it has cooled from extrusion temperature to room temperature and hence has solidified.

The invention may be used to manufacture a bicomponent lamina useful to line tanks by securing the lamina to the tank interior wall via adhesive applied to the fabric side of the lamina. Both glass and polyester may be used as the fabric; glass is stiffer and stronger; polyester makes the lamina more flexible and formable.

Either a chromed or a textured roll may be used as driven roller 18. Selection between a chromed or textured roller as driven roller 18 depends on whether the operator desires to produce a smooth surface on the thermoplastic side of the bicomponent lamina or a textured finish on the plastic surface side of the bicomponent lamina.

While the preferred embodiment of the invention is described above, the scope of protection to which the invention is believed entitled is defined by the claims and by equivalents thereto which perform substantially the same function in substantially the same way to achieve substantially the same result as set forth in the claims, so long as such substantial equivalents, as defined by claims which may be prepared for such substantial equivalents, do not read on the prior art.

I claim:

1. Apparatus for producing a solidified, continuous thermoplastic-fabric bicomponent lamina for further processing having thermoplastic on one side and fabric on the other side with the fabric embedded in the thermoplastic to define a fabric-plastic interface of said bicomponent lamina, comprising:
   a. means for extruding thermoplastic as a transversely-elongated, thermoplastic web from a solidified state;
   b. means for dispensing said fabric from a fabric supply;
   c. means for pressing said fabric and said thermoplastic web together with a force to produce a continuous thermoplastic-fabric bicomponent lamina in an initial, deformable state;
   d. first means for advancing said lamina from said pressing means at a first preselected rate;
   e. second means for advancing said lamina at a second preselected rate;
   f. controlled drive means on at least one of said advancing means to control one of said preselected rates independent of the other preselected rate; and
   g. means for regulating heat transfer to and from said lamina while said lamina is being advanced by said advancing means to maintain said lamina in said initial deformable state.

2. Apparatus of claim 1 wherein said pressing means further comprises means for regulating the temperature of said continuous thermoplastic-fabric bicomponent lamina during pressing.

3. Apparatus of claim 1 further comprising means for heating said fabric as said fabric approaches said extruded thermoplastic web prior to being pressed thereinto to form said continuous bicomponent lamina.

4. Apparatus of claim 1 wherein said means for pressing said fabric and said thermoplastic web together further comprises means for controlling said force to limit penetration of said fabric into said thermoplastic sufficiently to form only said continuous bicomponent lamina having thermoplastic on one side and fabric on a remaining side, devoid of thermoplastic at said remaining side.

5. Apparatus of claim 1 further comprising a second means for regulating heat transfer from said lamina after said lamina has advanced from said advancing means to promote solidification of said lamina before further processing.

6. Apparatus of claim 5 wherein said second regulating means comprises an expandable series of idler rollers of a preselected length for transporting said continuous bicomponent lamina from said second advancing means through a cooling medium.

7. A method for producing a continuous bicomponent lamina having thermoplastic on one side and fabric, embedded into said thermoplastic, on the other side, comprising:
   a. extruding a transversely elongated thermoplastic web;
   b. advancing fabric from a fabric supply towards said transversely elongated thermoplastic web;
   c. pressing said fabric and thermoplastic webs together with sufficient force to embed said fabric in said thermoplastic web to form said continuous bicomponent lamina; and
   d. controlling heat transfer to and from said continuous bicomponent lamina by contacting said continuous bicomponent lamina with a surface maintained at a controlled temperature for a preselected time after pressing together of said thermoplastic and said fabric while advancing the contacted surface of said bicomponent lamina at a rate independent of rate of advancement of said bicomponent lamina where said thermoplastic and fabric are initially pressed together.

8. The method of claim 7 wherein said pressing further comprises:
   a. urging said fabric and said thermoplastic web together with a first force to form said continuous bicomponent lamina while initially regulating heat transfer to and from said thermoplastic to a degree sufficient to maintain said continuous bicomponent lamina in a readily deformable state for a preselected time after said fabric and said thermoplastic web are urged together with said first force; and
   b. continuing urging said fabric and said thermoplastic web together with a second force reduced from said first force while contacting said continuous bicomponent lamina with a surface maintained at a preselected temperature thereby regulating heat transfer to and from said continuous bicomponent lamina as said continuous bicomponent lamina cools to room temperature.

9. The method of claim 8 wherein said initial regulation of heat transfer to and from said continuous bicomponent lamina is performed by contacting said continuous bicomponent lamina with a surface at a first preselected temperature sufficient to maintain said thermoplastic in a readily deformable, pliable state.

10. The method of claim 9 wherein said initial regulation of heat transfer to and from said continuous bicomponent lamina is performed by contacting said thermoplastic side of said continuous bicomponent lamina.

11. The method of claim 8 wherein regulation of heat transfer to and from said continuous bicomponent lamina is performed by serially contacting said thermoplastic and said fabric surfaces of said bicomponent lamina with surfaces maintained at preselected temperatures to regulate heat transfer to and from said continuous bicomponent lamina sufficiently to maintain said thermoplastic initially in a readily deformable state.

12. The method of claim 7 further comprising heating said fabric as said fabric approaches said thermoplastic web prior to being pressed thereinto.

13. The method of claim 7 wherein said plastic is selected from the group consisting of polyvinylidene fluoride, polyethylene, polypropylene, ECTFE, polyetherimid, polysulfone and polyethersulfone.

14. A method for producing a continuous bicomponent lamina consisting of thermoplastic and fabric and having one outwardly facing thermoplastic surface and a second outwardly facing fabric surface, comprising:
   a. progressively advancing:
      i. extruded thermoplastic material as a transversely elongated thermoplastic web; and
      ii. fabric as a transversely elongated fabric web from a fabric supply towards said progressively advancing extruded thermoplastic web while heating said fabric web;
   b. continuously pressing said fabric web and said thermoplastic web together with a first force to imbed said fabric web in but not through said thermoplastic web thereby to form said continuous bicomponent lamina while progressively advancing the resulting continuous bicomponent lamina at a first rate and controlling heat transfer to and from said advancing bicomponent lamina; and
   c. thereafter continuing progressively advancing said thermoplastic-fabric continuous bicomponent lamina at a second rate independent of said first rate.

15. The method of claim 14 further comprising pressing said thermoplastic-fabric continuous bicomponent lamina together with a second force while continuing progressively advancing said thermoplastic-fabric continuous bicomponent lamina at said second rate.

16. The method of claim 15 wherein said step of controlling heat transfer to and from said continuous bicomponent lamina is accomplished by serially contacting said continuous bicomponent lamina, while said lamina is advancing, with surfaces at first and second preselected temperatures.

17. The method of claim 16 wherein said step of pressing said lamina with a second force and said step of contacting said lamina with a surface at a first preselected temperature conclude substantially simultaneously.

18. The method of claim 17 wherein said second preselected temperature exceeds said first preselected temperature and said first preselected temperature exceeds the temperature to which said fabric is heated prior to being pressed against said thermoplastic web.

19. Apparatus for producing a continuous bicomponent lamina, comprising:
   a. means for grippingly advancing said thermoplastic and fabric webs and pressing the same together to form said continuous bicomponent lamina web, including:
      i. a pair of nip rollers spaced together sufficiently closely to grippingly engage and advance said thermoplastic and fabric webs to imbed said fabric into said thermoplastic to thereby form said continuous bicomponent lamina without subsequently deforming said continuous bicomponent lamina; and
   b. means for regulating temperature of said resulting continuous bicomponent lamina web, including:
      i. a controlled temperature roller, spaced from said nip roller pair which grippingly engage and advance said continuous bicomponent lamina web, adapted for rotation at speed independent of said rollers of said nip pair, having said continuous bicomponent lamina wrapped around a portion of a curved periphery thereof and urged thereagainst at least in part by action of said nip roller pair advancing said continuous bicomponent lamina along a path including a curved portion defined by a part of the curved periphery of said controlled temperature roller.

20. Apparatus for producing a continuous bicomponent lamina of thermoplastic and fabric, the thermoplastic facing outwardly on one side and fabric, embedded in said thermoplastic, facing outwardly on the other side, comprising:
   a. an extruder-die combination for converting thermoplastic material into a highly viscous thermoplastic web at a temperature at which the surface of said thermoplastic web is penetrable by fabric when applied thereagainst with preselected force, to a depth sufficient that said fabric is tightly retained by and effectively bonded to said thermoplastic when said thermoplastic cools to room temperature, without melting said fabric;
   b. a fabric supply roller for providing said fabric as a transversely elongated fabric web advancing towards said thermoplastic web;
   c. a pair of controlled temperature nip rollers, one of said rollers carrying said fabric web through an arcuate path defined by the periphery of said roller and optionally controlling temperature of said fabric web via contact therewith;
   d. means for feeding said fabric and thermoplastic webs between a nip defined by said two rollers and thereby pressing said fabric web and said thermoplastic web together with first force so that said fabric penetrates the surface of said thermoplastic web to a depth sufficient that said fabric is tightly retained by and effectively bonded to said thermoplastic web when said thermoplastic web cools to room temperature;
   e. said rollers of said nip being at different temperatures, said roller contacting said advancing transversely elongated fabric web being at the lower of the two temperatures, said roller of said nip which is at the higher temperature being adapted for having said continuous bicomponent lamina web wrapped around a portion of the curved periphery thereof and held thereagainst by action of a second nip roller pair longitudinally pulling said continuous bicomponent lamina web along a path including a curved portion defined by said portion of the curved periphery of said roller which is at the higher temperature; and
   f. a third controlled temperature roller, longitudinally spaced from said second nip roller pair which pulls and longitudinally advances said continuous bicomponent lamina web, for having said continuous bicomponent lamina web wrapped around a portion of the curved periphery thereof after said continuous bicomponent lamina web departs from said roller of said nip which is at the higher temperature and being urged thereagainst by action of said second nip roller pair pulling said continuous bicomponent lamina web against a portion of the curved periphery of said third controlled temperature roller; said third controlled temperature roller being rotatable at a rate different from and independent of said roller of said nip roller pair;

g. means for independently adjusting speed of rotation of said controlled temperature rollers for thereby advancing said lamina surfaces contacting said respective second and third controlled temperature rollers at independent rates; and h. said second nip roller pair grippingly engaging and longitudinally advancing said thermoplastic-fabric continuous bicomponent lamina web without deforming said continuous bicomponent lamina web and being longitudinally displaced from said third temperature controlled roller sufficiently so that said continuous bicomponent lamina web cools to solidification temperature and said fabric yarns are tightly retained by and effectively bonded to said web.

21. Apparatus for producing a continuous bicomponent lamina of thermoplastic and fabric, having thermoplastic facing outwardly on one side and fabric, embedded in said thermoplastic, facing outwardly on the other side, comprising:

a. means for extruding thermoplastic material as a highly viscous thermoplastic web at a temperature at which said thermoplastic web is penetrable by said fabric applied thereagainst with preselected force, to a depth sufficient that said fabric is tightly retained by and effectively bonded to said thermoplastic web when said thermoplastic web has cooled to room temperature, without melting said fabric;

b. means for progressively advancing said fabric at an initial rate as a transversely elongated fabric web from a fabric supply towards said thermoplastic web;

c. first means for progressively pressing said fabric web and said thermoplastic web together with a first force to form said continuous bicomponent lamina while contacting both sides thereof with surfaces maintained at controlled preselected temperatures thereby to regulate heat transfer to and from said continuous bicomponent lamina;

d. second means for progressively pressing together said continuous bicomponent lamina with a second force reduced from said first force while advancing said continuous bicomponent lamina at a rate of travel independent of said initial rate and contacting said continuous bicomponent lamina with a surface at a preselected temperature to control heat transfer to and from said continuous bicomponent lamina to maintain said continuous bicomponent lamina in a pliable state; and e. means for progressively advancing said continuous bicomponent lamina from said second means until said lamina has cooled to a temperature at which said lamina can be handled.

22. A method for producing a continuous bicomponent lamina having thermoplastic on one side and fabric, embedded into said thermoplastic, on the other side, comprising:

a. extruding a transversely elongated thermoplastic web;

b. advancing fabric from a fabric supply towards said transversely elongated thermoplastic web;

c. pressing said fabric and said thermoplastic web together with sufficient force to embed said fabric in said thermoplastic web to form said continuous bicomponent lamina in an initial deformable state;

d. advancing said continuous bicomponent lamina at a first rate;

e. controlling heat transfer to and from said lamina while said lamina is being advanced at said first rate to maintain said lamina in said initial deformable state;

f. advancing said continuous bicomponent lamina at a second rate independent of said first rate;

g. controlling heat transfer to and from said lamina while said lamina is being advanced at said second rate to maintain said lamina in said initial deformable state; and h. cooling said lamina from said initial, deformable state to a final, rigid state.

* * * * *